March 6, 1945.  A. S. McDONNELL  2,370,741
DEVICE WHEREWITH TO SET THE POINTS OF BEAM-COMPASSES AND THE LIKE
Filed April 20, 1943  3 Sheets-Sheet 1
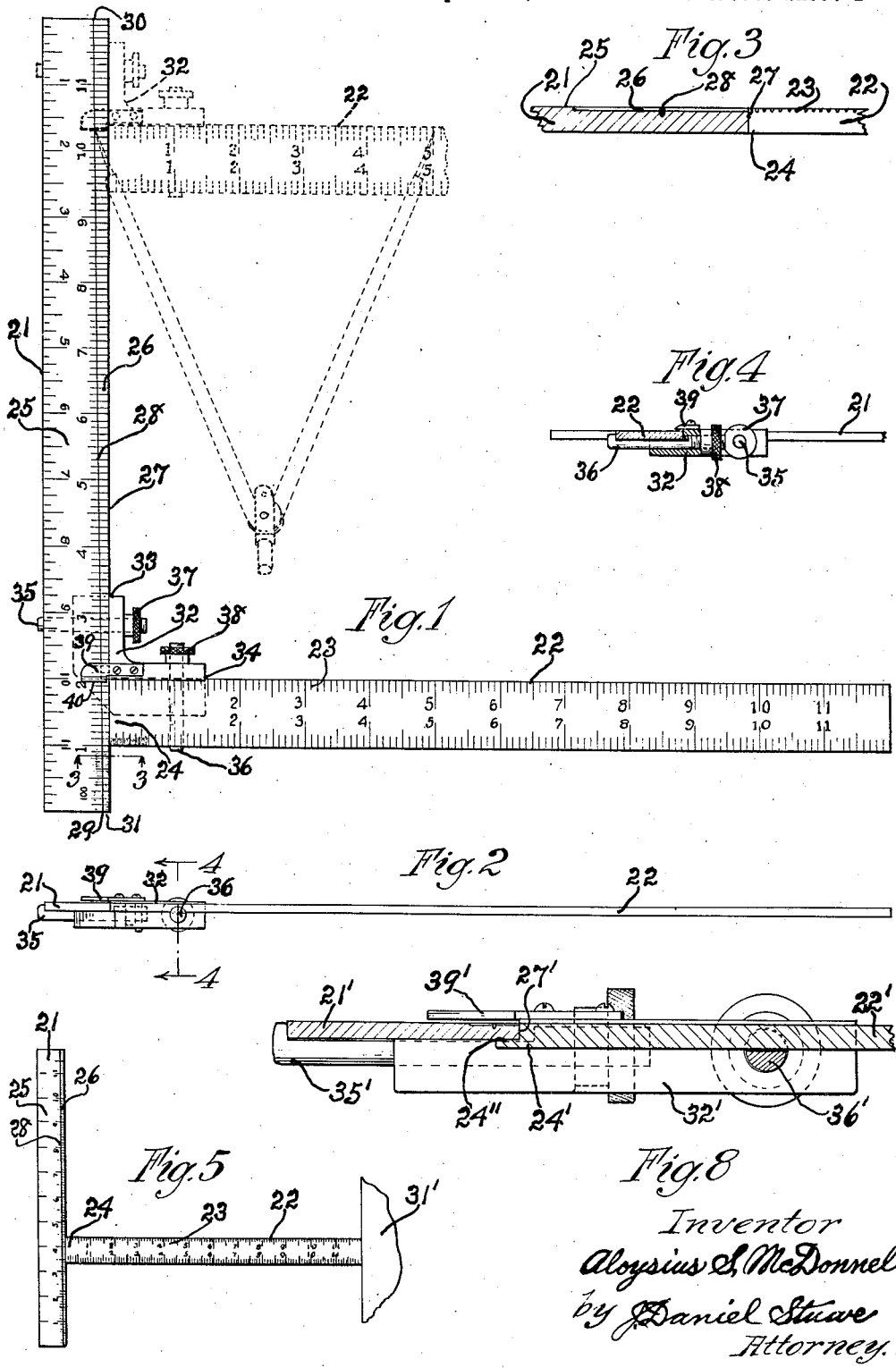

Inventor
Aloysius S. McDonnell
by J. Daniel Stuwe
Attorney.

March 6, 1945.  A. S. McDONNELL  2,370,741
DEVICE WHEREWITH TO SET THE POINTS OF BEAM-COMPASSES AND THE LIKE
Filed April 20, 1943  3 Sheets-Sheet 3
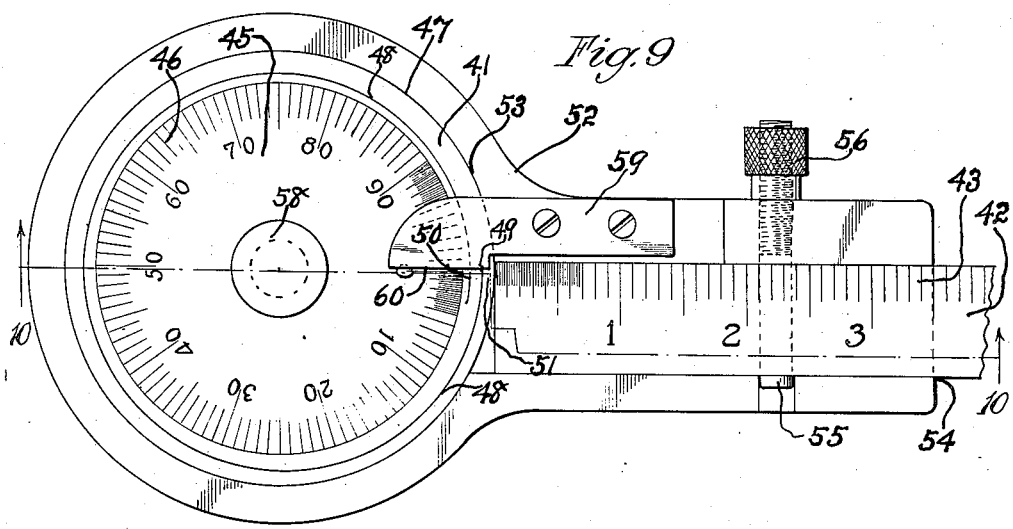
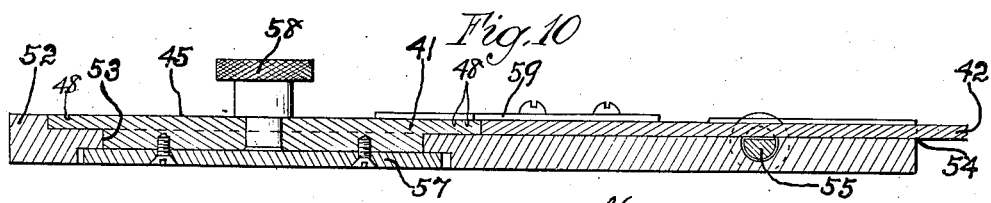
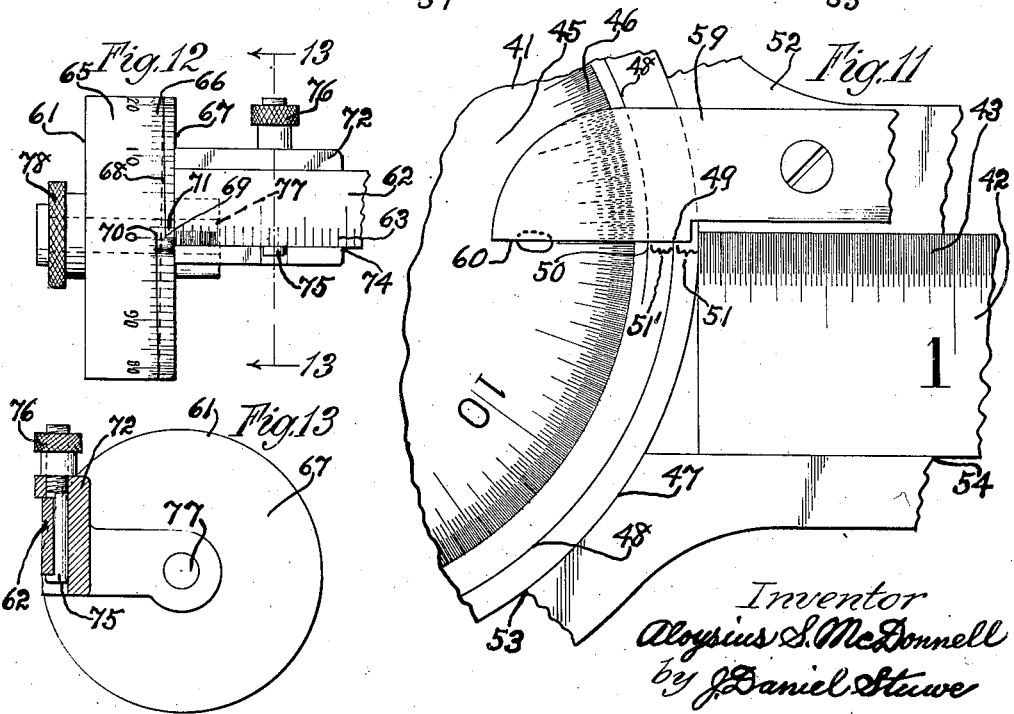
Inventor
Aloysius S. McDonnell
by J. Daniel Stuwe
Attorney.

Patented Mar. 6, 1945

2,370,741

UNITED STATES PATENT OFFICE 2,370,741

DEVICE WHEREWITH TO SET THE POINTS OF BEAM COMPASSES AND THE LIKE

Aloysius S. McDonnell, Chicago, Ill.

Application April 20, 1943, Serial No. 483,728

8 Claims. (Cl. 33—103)

This invention relates to a unique and efficient device wherewith to set the points of a beam-compass and the like.

One of the essential objects of this invention is to provide a graduated device wherewith the points of such an instrument as a beam-compass, a dividers, a trammel, and the like, can be set to a minute degree of accuracy.

Another object of this invention is to provide a graduated device wherewith it is possible to set the points of a beam-compass and the like conveniently and to a more minute extent than is possible with the use of the current graduated scales that are now generally utilized for that purpose.

Another object of this invention is to provide such a device whereby the compass points can be set to a high degree of accuracy, and which device can be produced economically, as by producing a special member which is minutely and specially graduated and which is arranged to be used in conjunction with a known graduated scale that is inexpensive and can be obtained in the open market, such as a mechanic's scale of known construction.

A further object of this invention is to provide such a device in several preferred forms, to suit the various desires of the different users and the various purposes for which such device may be utilized.

These and various other objects and advantages are attained with this invention, as will become apparent from the following description, taken in connection with the accompanying drawings wherein the invention is shown in a few of its preferred forms, it being evident that other arrangements and forms of construction may be adopted for carrying out the objects and purposes of this invention.

In the drawings:

Fig. 1 is a plan view illustrating an embodiment of this invention in one of its most desireable forms of construction, comprising the special member in conjunction with a graduated scale of known construction and a clamping frame whereby they are secured together.

Fig. 2 is an end view thereof.

Fig. 3 is an enlarged vertical sectional view, taken on line 3—3 of Fig. 1.

Fig. 4 is a vertical sectional view, taken on line 4—4 of Fig. 2.

Fig. 5 is a plan view, at reduced size, showing the special member in conjunction with a graduated scale and the two placed in an operative position, without any clamping frame, but the scale being set against an abutment.

Fig. 8 is a vertical sectional view of this form, taken on line 8—8 of Fig. 7.

Fig. 9 is a plan view showing this invention in another modified form, wherein the special member is disk-shaped and the setting line thereon is spiral-shaped, while the clamping frame supports said member rotatably and receives and holds the scale in position.

Fig. 10 is a vertical sectional view thereof, taken on line 10—10 of Fig. 9.

Fig. 11 is a fragmentary view showing the essential parts of this form on an enlarged scale.

Fig. 12 illustrates a further modified form of the invention, wherein the special member is in the form of a drum and the setting line is curved around its peripheral face.

Fig. 13 is a view thereof partly in section, taken on the line 13—13 of Fig. 12.

Figure 6:
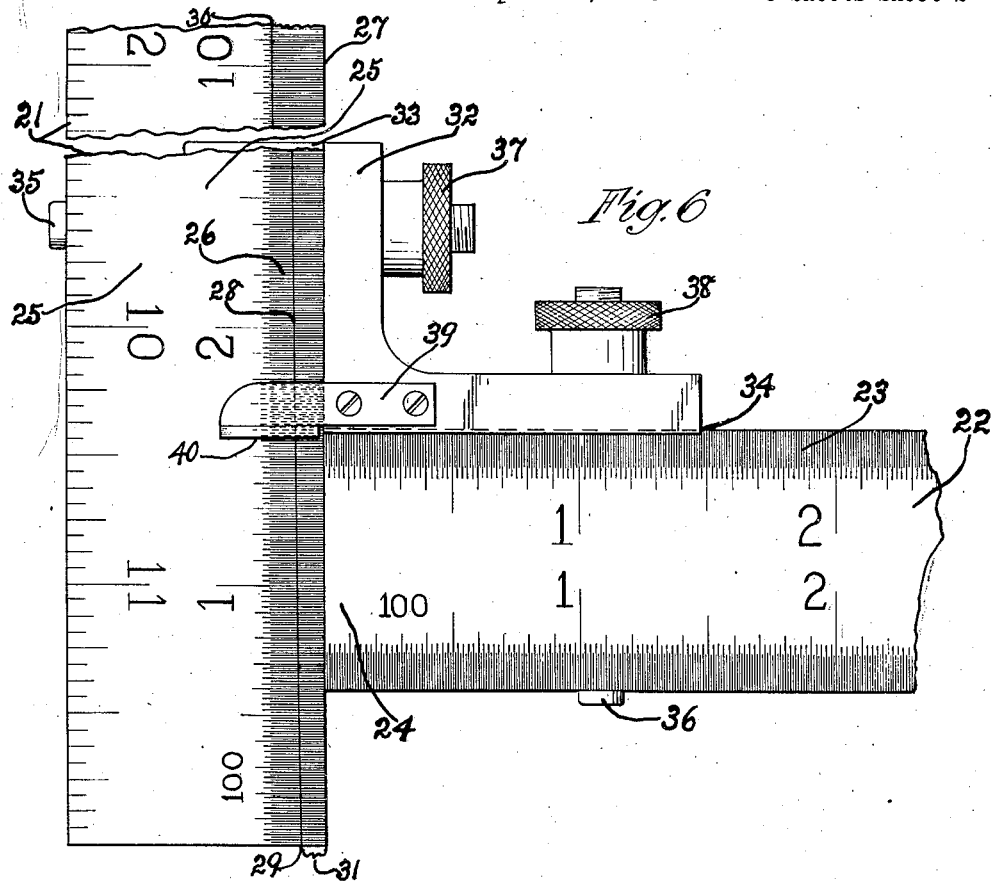
Fig. 6 is an enlarged fragmentary plan view of this form of the invention.

It is customary for a mechanic or an engineer to set the points of a beam-compass, a dividers, a trammel, and the like, by using a graduated scale; but such a scale as the mechanics and the engineers generally use, comprises among its graduations one set containing 100 graduation lines per inch, but is not graduated finer than such 100 lines per inch. Thereby it is difficult to set the compass points accurately to any greater degree of fineness than $\frac{1}{100}$ of an inch. It is also impractical to calibrate such usual scale much finer than stated above, or as fine as several 100 lines to the inch, since then the graduation lines become too fine to construct and also become too difficult to read readily on the bar-shaped scale of practical size, usually 12 inches in length.

I have therefore provided my improved device whereby the points of a beam-compass and the like can be set to a much finer degree of accuracy than has been done so far with the customary means. With my invention, in either of its forms disclosed herein, I provide a special and finely graduated member and arrange it so that it can be used in conjunction with a known scale bearing standard graduations, including graduations containing 16 lines to 100 lines per inch;

and either of such graduations on such scale may be conveniently used with my device, whereby the compass points can be set readily and accurately to 1/10000 part of an inch, more minutely and accurately than was done here-tofore.

Figure 7:
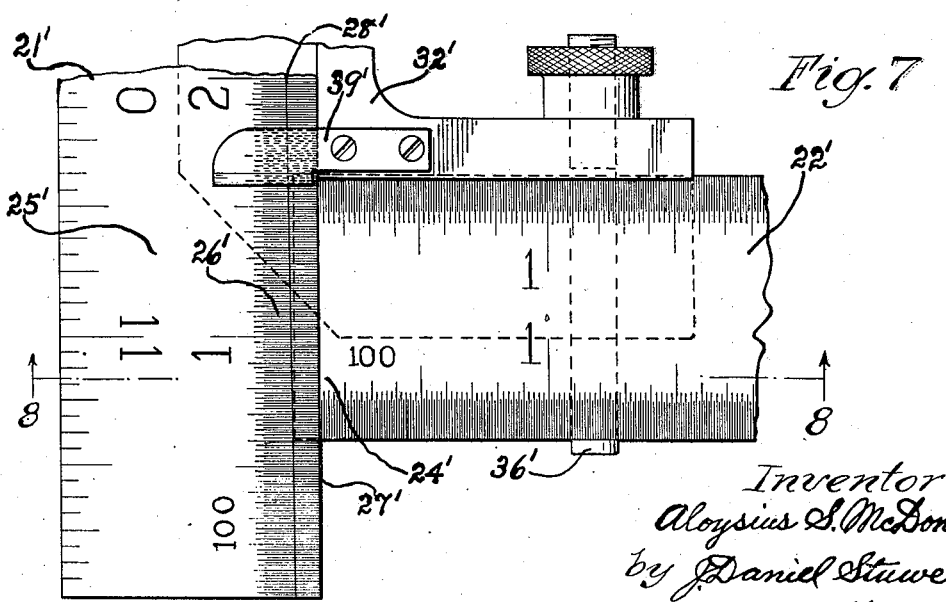
Fig. 7 is a fragmentary plan view showing the invention in a slightly modified form, wherein one end of the scale is notched, to engage the side of said member and compensate for the offset or distance from said side to the initial end of the setting line that is provided on said member.

As illustrated in the drawings, my invention comprises a specially graduated member, as is shown in Figs. 1 to 6 by member 21, in Figs. 7 and 8 by member 21', in Figs. 9, 10 and 11 by member 41, and in Figs. 12 and 13 by member 61. This special member I arrange to use in conjunction with a graduated scale of known and substantially standard construction and bearing the known graduations thereon, as is indicated by the scale 22 in Figs. 1 to 6, by the scale 22' in Figs. 7 and 8, by the scale 42 in Figs. 9, 10 and 11, and by the scale 62 in Figs. 12 and 13.

The scale 22 is of the customary and substantially standard bar-shaped or straight-edge construction which bears the usual graduations 23 thereon, which in this form illustrated in Figs. 1 to 6 comprises 100 lines to the inch; and said scale has one end 24 thereof set in selected position against the side of member 21 and perpendicular thereto, as indicated in the drawings; and as said graduations on the scale 22 are used for obtaining the full inches and main parts of an inch desired for setting the compass points, it is only necessary to graduate these lines so as to comprise 10 lines per inch, while the conjoined member 21 is graduated and arranged to provide the extremely minute part of the desired distance between the compass points.

It should be noted that altho these graduations are shown herein as being upon a mechanic's scale and as comprising 100 lines per inch, as are also the graduation lines on member 21, they may also be differently divided, as on an architect's scale and the like; and such member and scale may likewise be graduated according to the metric system, including millimeters and the like.

In Figs. 1 to 6 of the drawings the special member 21 is shown in the form of a bar-shaped scale, quite similar in construction to the graduated scale 22, thereby tending to provide economy in its manufacture. This member 21 bears on its upper face 25 graduation lines 26; and in this form these lines comprise 100 lines per inch over the length of said member, and are positioned adjacent one side 27 of the member which is a straight side and against which the end 24 of the scale 22 is abutted in its operative position. Said graduation lines 26 extend perpendicular to said side 27.

The member 21 is provided with a special setting line 28, which is a straight line in this form, and it extends substantially from one end of said member to the other, at least for a length of 10 inches thereon. This setting line 28 extends in a direction diagonal to said graduation lines 26, and it slants from one of its ends 29 to the other end 30 at a uniform rate of increase away from the side 27. Said setting line 28 and also said graduation lines 26 are herein shown as being placed closely adjacent the side 27, with the setting line extending or cut across the graduation lines.

The setting line 28 is cut or etched on the face 25 of the member 21 to provide a slight groove thereon, and it is shown in an exaggerated manner in Fig. 3. Said line is inclined or slanted at a uniform rate and at such a rate that on 10 inches lengthwise of said member its increment, that is the distance this line advances away from side 27, will increase 1/10 of an inch; and thus in one inch lengthwise of said member 21 the distance or increment will be increased by 1/100 of an inch. Consequently, since one inch lengthwise of this member 21 bears 100 graduation lines, taken from the zero end toward the 10 inch part of said member, each one of these graduation lines increases, over its preceding line, in its distance from said side 27 to said setting line 28, by 1/100 of 1/100 of an inch, that is, by 1/10000 of an inch. Then, by placing such a scale 22 with its end 24 abutting against the side 27 to extend perpendicular to said side, in the proper position where the minute part of the desired measurement can be obtained from this setting line, and by setting the points of the compass or dividers to place one point at the desired graduation on said scale, and the other point at the correct position on the setting line 28 and graduation line 26, with the compass and its points perpendicular to said side 27 and thus parallel to the scale part containing the graduations 23, as indicated by the dividers in dotted outline in Fig. 1, the two points of a beam-compass and a dividers and the like can be set readily and accurately to a fineness of 1/10000 part of an inch.

It should be noted, that since it is difficult to start this setting line 28 exactly at the corner at the zero end and the side 27 of member 21, and to retain it clearly visible at such corner after extended use, it is preferable to start said line a slight distance away from said side 27, as illustrated herein. Such distance or offset 31, between said side 27 and the initial end 29 of said line 28, is preferably equal to 1/10 of an inch, so that the point of the compass which is set on the graduation line on the scale 22 can be set conveniently on the line at 1/10 inch closer than the length desired to be used on the scale.

As an illustration, it is indicated in Fig. 1 how the points of a compass or dividers or the like can be placed for setting the points at 5.203 inches. One point is set at the 5.1 graduation line on the scale 22, while the other point is set on the setting line 28 on member 21, at its thirtieth graduation line. This provides the setting of 5.203 inches, which includes the full 5.1 inches on the scale 22, and the 1/10 of an inch for the offset at the initial end 29 of said line 28, and the additional distance or increment of 30/10000 or 0.003 of an inch provided by the slanting of said line 28 at the point of the thirtieth division along the length of said member 21.

The form and parts of this invention as described above, and as it is substantially shown in Fig. 5 of the drawings, can be efficiently used and will serve the purpose of this invention; but it is preferable to set the outer end of the scale, that is away from member 21, against an abutment 31', to retain the scale joined with member 21, as shown in Fig. 5. It is furthermore advantageous to provide retaining means for engaging and holding the scale firmly in its operative position abutting with its end 24 against the side 27 of member 21; and in Figs. 1 to 6 such retaining means is indicated as a frame 32 including a seat 33 and a seat 34 for receiving, respectively, the member 21 and the scale 22 placed perpendicular to member 21, while elements 35 and 36 are associated with said seats 33 and 34 and have nuts 37 and 38 adjustable thereon, for clampingly securing said member and scale together in proper position, substantially as illustrated.

A setting finger 39 is preferably also provided, being conveniently mounted on the frame 32, and it has a guide edge 40 which projects slightly inwardly beyond the adjoining edge of the seat 34 and of the edge of the scale 22 held therein; so that this edge 40 provides a convenient guiding means or setting edge for accurately positioning the compass points thereby.

In Figs. 7 and 8 is shown a slightly modified form, wherein the member 21' is substantially identical with the above described member 21, including the same arrangement of its face 25' with its graduation lines 26' and also the setting line 28', adjacent the side 27'; but in this form the active end 24' of the scale 22' is provided with a narrow end notch 24'', for receiving therein a part of member 21' adjacent its side 27'. As the offset or distance at the intial end of the setting line 28' from said side 27' is $\frac{1}{10}$ of an inch, like the offset 31 in the preceding form, this notch 24'' is likewise cut to a depth or width of $\frac{1}{10}$ of an inch into the end of the scale, so as to compensate for that offset; and the desired distance between the two points on a compass or the like can thus be more readily ascertained by this form of construction. The retaining frame 32' and its parts are also like their equivalents in the form disclosed above, including the elements 35' and 36' and the setting finger 39'.

Figs. 9, 10 and 11 illustrate this invention in another modified form, wherein the setting member is shown in the form of a disk-shaped member 41; while the scale 42, used in conjunction therewith, bears the graduation lines 43 thereon, being provided at least along one side thereof and being divided on the decimal system to include at least 10 lines to the inch, or may include 100 lines to the inch; and a scale of the usual standard construction and arrangement will likewise be useful in place of this shown scale 42.

The disk-like member 41 bears on its upper face 45 the graduation lines 46, which extend radially of the face, and the group of lines occupy an annular part thereon, between the center of said face and its periphery, said periphery lying on the peripheral side 47 of this disk-like member. This annular ring of graduation lines is shown as placed adjacent to the periphery of the face, and is divided into 10 sections with each section preferably including 100 graduation lines, as best indicated in Fig. 11; while each graduation line 46 extends perpendicular to said side 47 against which the end of said scale 42 is abutted. Where the companion scale used has its graduation lines comprising 100 to the inch, then these graduation lines 46 need not extend entirely around the face 45, in the manner shown in Fig. 9; but only over a section thereof which comprises 100 graduation lines 46 and covers 36 degrees of the 360 degrees of the face 45 illustrated, whereby to provide for the thousandth and the ten thousandth part of an inch, since the scale 42 provides for setting accurately to the hundredth part of an inch.

A setting line 48 is provided on said face 45, being placed adjacent the peripheral side 47 of said member, and this line is curved from one of its ends 49 to the other end 50 at a uniform rate of increase away from said side 47. Said line is cut or etched in said face in the shape of a slight groove, as best shown in Fig. 10, and its initial end 49 is preferably started a slight distance inward from said side 47, being herein indicated as a width or offset 51 of $\frac{1}{10}$ of an inch, like in the form described above. The uniform inward curvature of this setting line 48 is preferably arranged so that in 360 degrees entirely around the face of the increment or space between the end parts of this line, taken radially outward of a line 46, is $\frac{1}{10}$ of an inch, similarly as in the preceding form, and as is indicated by the space or distance 51' of Fig. 11. Similarly the inward curvature of said setting line 48 amounts to $\frac{1}{100}$ part of an inch for its length extending over $\frac{1}{10}$ of the circular face or over 36 degrees of said face. This device is thus also arranged for use in setting the compass points accurately to the $\frac{1}{10000}$ part of an inch, like the first described form.

A frame 52 is provided for supporting and retaining the member 41 and the scale 42 together in their operative position, and it includes a seat 53 for rotatably supporting said member 41 therein, and a seat 54 for receiving therein the scale 42 which may be clamped in place by a clamping element 55 with a nut 56. A retaining plate 57 is secured underneath member 41 and engages beneath this frame 52 for retaining said member rotatably in its seat; while a knob 58 is preferably provided on member 41 to facilitate turning it to the proper position in the frame.

A setting finger 59 is preferably provided herein and it is conveniently mounted on the frame 52, and has a guide edge 60 which projects slightly inwardly beyond the adjoining edge of the seat 54 and of the scale 42 therein, thus providing a setting edge for setting the compass points thereby.

Figs. 12 and 13 illustrate this invention embodied in a further modified form, wherein the special member is shown in the shape of a drum 61; and the scale 62 which may be used in conjunction with said member bears the graduation lines 63 thereon. These lines may be provided along one side of this scale only, for setting one of the compass points thereon; and the scale is marked for inches with the lines arranged on the decimal system thereon.

The periphery of this drum-shaped member 61 constitutes a cylindrical face 65 which bears graduation lines 66 thereon, and the two circular edges or peripheral limits of the two sides 67 of the drum provide the two boundaries or sides of said face 65. Said graduation lines 66 are placed adjacent one side 67 and extend perpendicular thereto, as illustrated herein.

A setting line 68 is provided on said face 65, being also preferably placed adjacent such operative side 67, being shown herein as cutting across the graduation lines; and it is curved or slanted, from its initial end 69 to its final end 70, at a uniform rate of increase away from the adjacent side 67. Said line 68 preferably also has its initial end 69 placed $\frac{1}{10}$ of an inch away from the adjacent side 67, as shown by the offset 71, and also has the final end 70 spaced $\frac{1}{10}$ of an inch apart from said initial end 69, while the lines 66 are also suitably arranged and divided herein, all similarly to the preceding forms disclosed above.

A frame 72 is herein provided for rotatably supporting the drum 61, and it includes a seat 74 for receiving therein the scale 62 and contains a clamping element 75 with an adjustable nut 76 for securing the scale in position against the side 67 of the drum. The drum is turnable on the frame by means of a shaft 77 and the manipulation of a knob 78 which protrudes from the drum opposite to said side 67.

This form of the device, like the several forms described above, is thus also arranged and constructed for use in setting the compass points accurately to the 1/10000 part of an inch.

I claim:

1. A device adapted to be used in conjunction with a graduated bar-shaped scale of substantially standard construction bearing standard graduations, wherewith to set the points of a beam-compass and the like to a minutely accurate degree, said device comprising a member containing a face and a side which provides a boundary for said face, adapted to have said scale placed with one end against said side, so as to extend the scale perpendicular to the side and be readily removable, said face bearing minutely divided graduation lines which extend each perpendicular to said side and also bearing a setting line extending in a direction diagonal to said graduation lines and slanting at a uniform rate of increase away from said side, whereby, in setting the compass points, the scale is properly placed with its end abutting said side, and one point of the compass is set in proper position on said setting line while the other point is set in proper position on the graduation on said scale.

2. The subject matter set forth in claim 1, and wherein a frame is provided for adjustably holding the scale end against the side of the member, and a setting finger is provided on the frame to facilitate setting the compass points readily and accurately.

3. A device, wherewith to set the points of a beam-compass and the like, comprising a graduated bar-shaped scale of substantially standard construction bearing standard graduations thereon, also, a cooperating member which contains a face and a side against which side said scale is placeable freely and detachably with one end so that the scale and its graduations extend perpendicular to said side, said face bearing relatively finely divided graduation lines and also bearing a setting line which extends in a direction diagonal to said graduation lines and slants at a uniform rate of increase away from said side, adapted to have one point of the compass set in position on the setting line while the other point is set on the proper graduation on the abutting scale.

4. The subject matter set forth in claim 3, and which also includes frame means for securely supporting said member and for clamping the abutting end of said scale in place against the side of the member.

5. A device, wherewith to set the points of a beam-compass and the like, comprising a scale of known and substantially standard bar-shaped construction and bearing a set of standard graduations thereon, also a cooperating member which contains a face and a side adjoining the face and against which side the operative part end of the scale is detachably abutted in operation, said face bearing relatively many closely adjoining graduation lines thereon adjacent said side and also bearing a setting line adjacent the side and extending diagonally of the graduation lines and at a uniform rate of increase away from said side, means for supporting said member and retaining said operative part of the scale firmly in position abutting against said side but enabling ready withdrawal of said scale, and guide means to facilitate setting the compass points, whereby one of said points can be set on the setting line while bearing against said guide means and the other point set on the proper position on said scale graduation, to set the compass points to an extremely accurate degree.

6. A device, wherewith to set the points of a beam-compass and the like, comprising a bar-shaped mechanic's scale of standard construction bearing standard graduations thereon, also a substantially bar-shaped scale member which contains a face and a side adjoining the face and against which side one end of said scale is abutted in operation, said face bearing closely positioned graduation lines thereon and also a setting line adjacent said side and extending diagonally across the graduation lines and at a uniform rate of increase away from said side, frame means for adjustably holding the end of the scale firmly abutting against said side, and a guide finger on the frame means to facilitate setting the compass points, whereby said points can be conveniently set to a high degree of accuracy.

7. A device, wherewith to set the points of a beam-compass and the like, comprising a bar-shaped mechanic's scale bearing well known graduations thereon, also a cooperating member which contains a face and a side which bounds said face and against which side said scale is freely abutted with one end to extend said scale perpendicular to said side and to have their graduated top faces in the same plane, said face bearing minutely closely positioned graduation lines thereon and also a setting line adjacent said side and extending diagonally of the graduation lines and at a uniform rate of increase away from said side, from one end of the setting line to the other, and frame means for adjustably holding the end of the scale firmly in position against said side.

8. The subject matter set forth in claim 7, wherein said member is substantially in the form of a bar-shaped mechanic's scale of substantially standard construction and the setting line thereon is in the form of a straight line, whereby the compass points can be set accurately and precisely by setting one of the points in the intersection of the setting line with a graduation line, and setting the other point in position on the proper graduation line on said abutting scale.

ALOYSIUS S. McDONNELL.